(12) United States Patent
Fei et al.

(10) Patent No.: US 10,968,724 B2
(45) Date of Patent: Apr. 6, 2021

(54) CLASSIFICATION AND REGRESSION TREE ANALYSIS OF FORMATION REALIZATIONS

(71) Applicant: Landmark Graphics Corporation, Houston, TX (US)

(72) Inventors: Jin Fei, Houston, TX (US); Jeffrey Marc Yarus, Houston, TX (US); Richard L. Chambers, Yukon, OK (US); Shaolong Wu, Houston, TX (US)

(73) Assignee: Landmark Graphics Corporation, Houston, TX (US)

( * ) Notice: Subject to any disclaimer, the term of this patent is extended or adjusted under 35 U.S.C. 154(b) by 354 days.

(21) Appl. No.: 15/773,545

(22) PCT Filed: Feb. 5, 2016

(86) PCT No.: PCT/US2016/016787
§ 371 (c)(1),
(2) Date: May 3, 2018

(87) PCT Pub. No.: WO2017/135969
PCT Pub. Date: Aug. 10, 2017

(65) Prior Publication Data
US 2018/0320485 A1 Nov. 8, 2018

(51) Int. Cl.
*E21B 41/00* (2006.01)
*E21B 43/00* (2006.01)
(Continued)

(52) U.S. Cl.
CPC .......... *E21B 41/0092* (2013.01); *E21B 43/00* (2013.01); *E21B 49/00* (2013.01);
(Continued)

(58) Field of Classification Search
USPC .................................. 703/2, 10, 22; 716/102
See application file for complete search history.

(56) References Cited

U.S. PATENT DOCUMENTS

| | | | |
|---|---|---|---|
| 8,392,165 B2 | 3/2013 | Craig et al. | |
| 8,798,978 B2* | 8/2014 | Ertas | E21B 45/00 703/10 |
| 8,886,502 B2 | 11/2014 | Walters et al. | |
| 9,176,245 B2 | 11/2015 | Craig | |

(Continued)

FOREIGN PATENT DOCUMENTS

| | | |
|---|---|---|
| WO | WO-2015/030811 A1 | 3/2015 |
| WO | WO-2016/153482 A1 | 9/2016 |

OTHER PUBLICATIONS

International Search Report and Written Opinion from PCT/US2016/016787, dated Oct. 26, 2016, 15 pages.

*Primary Examiner* — Thai Q Phan
(74) *Attorney, Agent, or Firm* — Tenley Krueger; C. Tumey Law Group PLLC

(57) ABSTRACT

The selection of a candidate formation realization(s) from a plurality of formation realizations may be done with a classification and regression tree (CART) analysis taking into account petrophysical and geological properties. For example, a method may include applying a CART analysis to a plurality of formation realizations using a first formation property as a predictor in the CART analysis, wherein the plurality of formation realizations are for a second formation property and are based on at least one measured formation property, thereby yielding an association between the first and second properties for each of the plurality of formation realizations; analyzing a strength of the association for each of the plurality of formation realizations; and selecting a candidate formation realization from the plurality of formation realizations based on the strength of the association. The identified candidate formation realization(s) may then be used to develop the parameters of subsequent wellbore operations.

20 Claims, 6 Drawing Sheets

(51) Int. Cl.
*G01V 99/00* (2009.01)
*G06F 9/455* (2018.01)
*G01V 1/00* (2006.01)
*G06N 20/00* (2019.01)
*G06N 5/00* (2006.01)
*E21B 49/00* (2006.01)
*E21B 49/08* (2006.01)
*E21B 43/26* (2006.01)

(52) U.S. Cl.
CPC .............. *E21B 49/087* (2013.01); *G01V 1/00* (2013.01); *G01V 99/005* (2013.01); *G06F 9/455* (2013.01); *G06N 5/003* (2013.01); *G06N 20/00* (2019.01); *E21B 43/26* (2013.01); *G01V 2210/646* (2013.01); *G01V 2210/663* (2013.01)

(56) References Cited

U.S. PATENT DOCUMENTS

| | | | |
|---|---|---|---|
| 10,359,540 B2* | 7/2019 | Yarus | G01V 99/005 |
| 10,528,681 B2* | 1/2020 | Yogeswaren | G01V 1/284 |
| 10,633,953 B2* | 4/2020 | Abou-Sayed | E21B 41/0092 |
| 2008/0022232 A1* | 1/2008 | McConaghy | G06F 30/33 716/102 |
| 2009/0055141 A1 | 2/2009 | Moncorge et al. | |
| 2009/0248312 A1 | 10/2009 | Hsu et al. | |
| 2013/0138410 A1* | 5/2013 | Yogeswaren | G01V 11/00 703/2 |
| 2015/0286954 A1 | 10/2015 | Maucec et al. | |
| 2016/0170087 A1* | 6/2016 | Yarus | G01V 99/005 703/10 |
| 2017/0152728 A1* | 6/2017 | Abou-Sayed | E21B 47/00 |
| 2020/0183047 A1* | 6/2020 | Denli | G01V 99/005 |

* cited by examiner

US 10,968,724 B2

CLASSIFICATION AND REGRESSION TREE ANALYSIS OF FORMATION REALIZATIONS

BACKGROUND

The present application relates to simulating subterranean formations.

A wellbore operation may be simulated using a model of a subterranean formation. For example, with regard to a hydrocarbon well, the wellbore operation may be a stimulation operation like a fracturing operation. Many parameters of the stimulation operation may be varied to improve the simulated production from the subterranean formation. The model of the subterranean formation may be constructed of a grid of cells, with each of the cells being associated with one or more geological properties (e.g., porosity, permeability, and the like) that define the subterranean formation.

In conventional geological modeling, several formation realizations are produced for a single property. Each formation realization is the result of a property of the formation (e.g., porosity, lithology facies, or total organic content) being modeled based on measurements of the formation (e.g., from well logs and seismic data) and various algorithms. The modeling changes slightly to produce different formation realizations for the single property. To address uncertainty and select a few candidate formation realizations, the formation realizations are ranked according to various criteria using a statistical analysis of the formation volumetrics. This approach does not account for the associations of petrophysical and geological properties.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

The present application relates to selecting a candidate formation realization from a plurality of formation realizations using a classification and regression tree (CART) analysis that takes into account the associations between petrophysical and geological properties. The identified candidate formation realization may then be used as the basis for developing the parameters of subsequent wellbore operations.

Further, the CART analysis described herein uniquely allows for the analyzing associations between both numerical properties and categorical properties, which is a characteristic that other analysis techniques lack.

As used herein, the term "numerical property" refers to a property that has a corresponding numerical value or range of values. Exemplary numerical properties that may be used in a CART analysis described herein may include, but are not limited to, modulus of elasticity, in situ facies stresses, leak-off coefficient, Poisson's ratio, porosity, permeability, water saturation, a hydrocarbon production amount, a proppant volume, and any combination thereof.

As used herein, the term "categorical property" refers to a property that has classes or divisions that are not numerically graded. Exemplary categorical properties that may be used in a CART analysis described herein may include, but are not limited to, lithology facies, a type of hydrocarbon(s) present in the formation, and any combination thereof. For example, the classes of lithology facies may include, but are not limited to, dolomite, shale, limestone, smectite, sandstone, clay (also known as claystone), chert, coal, diatomite, halite, anhydrite, gypsum, tuff, and the like.

The formation properties used in the methods and analyses described herein may be numerical properties, categorical properties, or a combination thereof.

Figure 1:
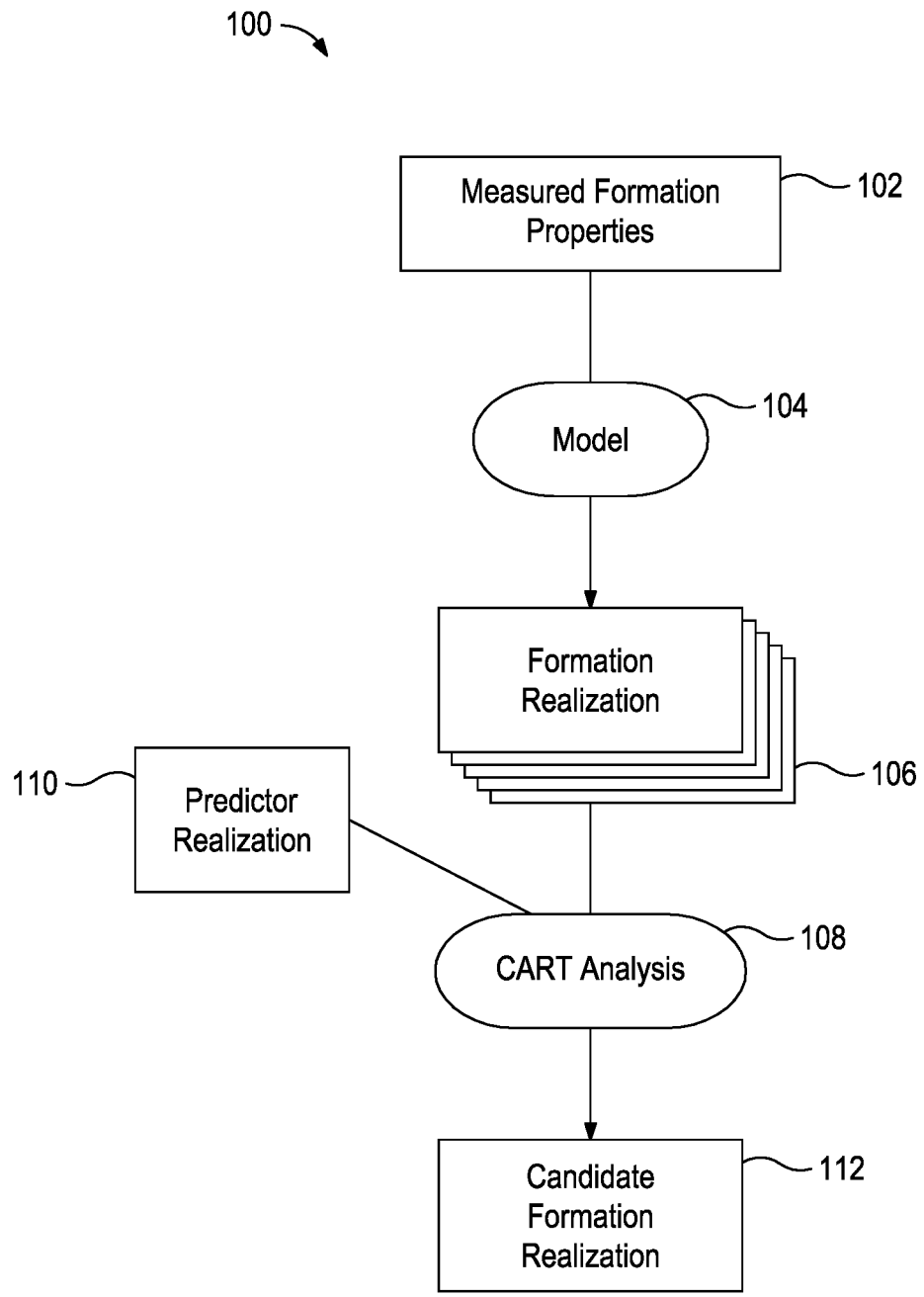
FIG. 1 provides a flow chart illustration of a method according to some embodiments of the present disclosure.

FIG. 1 provides a flow chart illustration of a method 100 according to some embodiments of the present disclosure. Using measured formation properties 102, a mathematical model 104 may be used to produce a plurality of formation realizations 106 for a first property of the subterranean formation. Then, a CART analysis 108 may be applied to the plurality of formation realizations 106 to partition each of the formation realizations 106 using a series of logic questions based on the first formation property (described in more detail below in FIG. 2). The partitioned formation realizations 106 are then associated with a second formation property (known as a predictor) via the predictor realization 110 (or predictor map). Finally, the strength of the association between the first formation property and the second formation property is used to select at least one candidate formation realization 112. For example, the candidate formation realization(s) 112 that provides a strong association between the first and second properties (or additional properties when third, fourth, etc. properties are analyzed as described further herein) may then be used for predicting sweet spots (i.e., highly connected portions of a formation with high amounts of a desired hydrocarbon), analyzing the reservoir quality and potential production of the formation, and developing the parameters of subsequent wellbore operations (e.g., drilling operations, stimulation operations, production operations, and the like). In some instances, more than one candidate formation realization 112 may be selected for further analysis, for example, for identifying sweet spots in the subterranean formation.

An exemplary mathematical model 104 may be DECISIONSPACE® EARTH MODEL (a modeling software, commercially available from Halliburton Energy Services, Inc.).

As used herein, the formation realizations 106 is the outputs of the mathematical model 104. Generally, the measured formation properties 102 are for only a portion of the formation. Accordingly, when considering a—dimensional grid matrix of the subterranean formation, uncertainty arises from points without data. To address this, a the model 104 uses a stochastic process (i.e., a process having a random probability distribution or pattern that may be analyzed statistically but may not be predicted precisely) to fill in the data. Because this is a stochastic process, multiple representations of the formation are possible. Accordingly, the mathematical model 104 produces a plurality of formation realizations 106.

As used herein, the formation realizations 106 are the output of the mathematical model 104 and may be represented as 3-dimensional grid matrices of the subterranean formation (also known as a geocellular grid), 1-dimensional arrays representing the subterranean formation, and the like. In a 1-dimensional array, the data points of the formation (e.g., the data points in the geocellular grid) are converted to mathematical matrix having matrix identification values corresponding to each data point.

Figure 2:
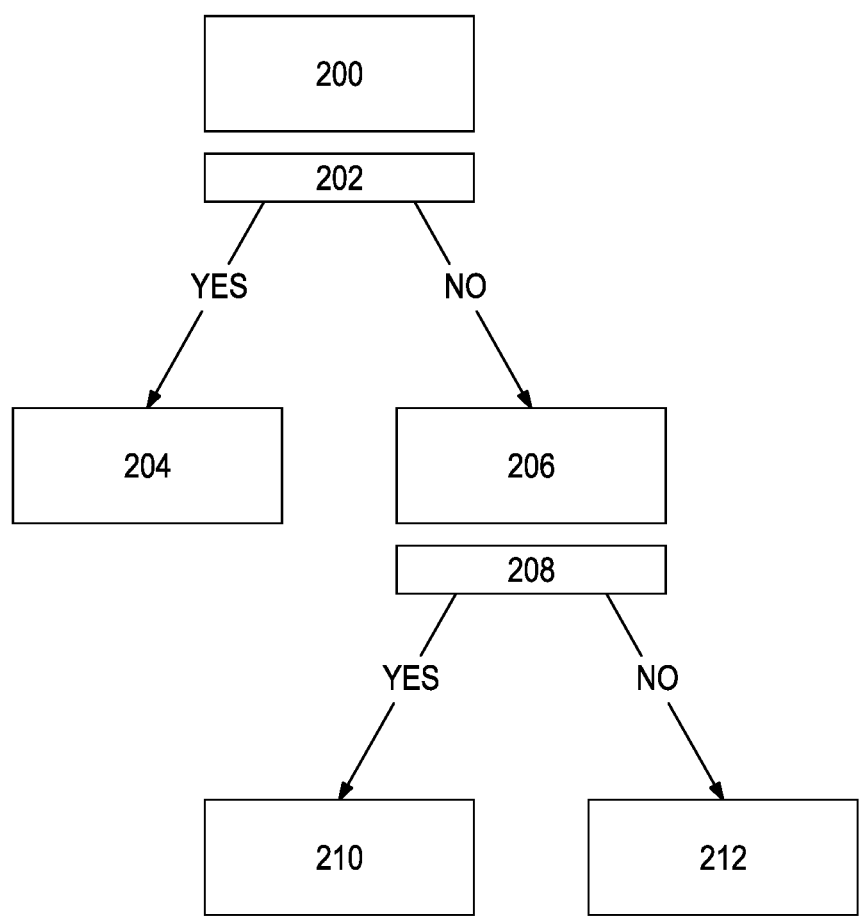
FIG. 2 illustrates an example of a CART analysis.

FIG. 2 illustrates an example of the CART analysis 108. The CART analysis 108 recursively partitions data 200 into progressively smaller groups 204,206,210,212 based on a "yes" or "no" answer to logic questions 202,208. In the illustrated example, the original data 200 is first partitioned by a logic question 202 into two data sets 204,206 based on the yes/no answer. The partitioned data set 206 corresponding to the no answer is further partitioned into two data sets 210,212 based on the yes/no answer to a logic question 208.

In the present application and in reference to FIGS. 1 and 2, the data 200 analyzed by the CART analysis 108 is formation realizations 106 produced by modeling a formation property and the logic questions is based on that formation property. For example, each cell of the geocellular grid or each element of the 1-dimensional array is associated with a value for a numerical property or categorical property. The partitioning is performed on a binary basis with a logic question based on the property. For example, a formation realization 106 based on porosity, lithology facies, or water saturation may be partitioned in two groups corresponding to a "yes" or "no" answer to a logic question like "Is the porosity greater than 0.05 porosity units?," "Is the lithology facies limestone?," or "Is the water saturation less than 0.25 saturation units?," respectively. The logic questions may be defined by a user of the CART analysis 108 or determined by the CART analysis as described further herein. Then, the smaller data sets may independently be further partitioned by another logic question. Once the formation realization 106 is partitioned into data sets as desired, the data points in each of the data sets are correlated to a data point in the predictor realization 110 based on location in a geocellular grid or each matrix identification values in a 1-dimensional array. Then, the predictor formation property has been associated with the formation realization property.

By way of nonlimiting example, a data set 200 corresponding to a permeability formation realization may be partitioned into a yes data set 204 and a no data set 206 based on the logic question 202 "Is the permeability greater than 0.1 millidarcy?" The yes data set 204 may include 25% of the original data set 200, and the no data set 206 may include the other 75%. Then, the no data set 206 may be partitioned by the logic question 202 "Is the permeability greater than 0.005 millidarcy?" The yes data set 210 may include 67% of the no data set 206, which is 50% of the original data set 200, and the no data set 212 may include the other 33% of the no data set 206, which is 25% of the original data set 200. Then, a second property (i.e., the predictor formation property) like the lithology facies may be associated with each of the terminal data sets 204,210,212. In this example, the percentage of data points in each of the terminal data sets 204,210, 212 that are sandstone, dolomite, and shale may be calculated. For example, data set 204 may have corresponding lithology facies of: 80% sandstone, 15% dolomite, and 5% shale; the data set 210 may have corresponding lithology facies of: 5% sandstone, 75% dolomite, and 20% shale; and the data set 212 may have corresponding lithology facies of: 1% sandstone, 15% dolomite, and 84% shale. In this example the terminal data sets 204,210,212, which were derived from partitioning based on permeability, are also strongly segregated by lithology facies. Therefore, the strength of the association between permeability and lithology facies is high because permeability partitioning provided terminal nodes with over 75% of the data in each of the terminal nodes corresponding to a single lithology facie. The strength of association in the method 100 would be determined after the CART analysis 108 by ranking how well the terminal nodes from each formation realization associate to the second formation property (i.e., the predictor formation property). The foregoing exemplary CART analysis may be performed for the plurality of permeability formation realizations and the realization(s) with the strongest association between permeability and lithology facies may be selected as the candidate formation realization(s) and used for further analysis. For example, two, three, or more formation realization having had the CART analysis applied may have strong associations and all be used in subsequent analyses like sweet spot identification or wellbore operation modeling.

The foregoing example may be extended to other properties like porosity or total organic content alternatively or in addition to the examples provided above. For example, the terminal data sets 204,210,212 may also be correlated to an average porosity predictor realization or total organic content predictor realization. Then, the strength of each of the associations between permeability and lithology facies, permeability and porosity, and permeability and total organic content may be considered when selecting a candidate formation realization 112. Therefore, in general, the CART analysis 108 may be based on an association between a first formation property calculated by the model 104 and one or more predictor formation properties, and selecting a candidate formation realization 112 from the plurality of formation realizations 106 may be based on the strength of the association between the first formation property and the one or more predictor formation properties.

In some instances, the CART analysis 108 may determine the logic questions 202,208. For example, the logic question 202 may be "Is the permeability greater than x millidarcy?" and the CART analysis 108 may iteratively change x from 0.001 to 1. For each iteration, the CART analysis 108 also calculates the percent of sandstone, dolomite, and shale in each of the yes and no data sets 204,206. The value for x that provides for the greatest difference between the percent of sandstone, dolomite, and/or shale in the two data sets 204,206 is selected to populate the logic question 202. The difference between the two data sets may be according to a Gini coefficient or entropy index when comparing categorical properties or according to an average, sums of squares, or the like when comparing numerical properties. This procedure is then repeated for determining the logic question 208, which may be "Is the permeability greater than y millidarcy?"

In the foregoing examples, both logic questions 202,208 are based on a single property because the formation realizations 106 are produced with a single property. However, alternatively, the model 104 may use the measured formation properties 102 and simultaneously calculate two or more formation properties to produce a plurality of formation realizations 106 where each location in a geocellular grid or each matrix identification values in a 1-dimensional array has a value for each of the two or more formation properties calculated by the model 104. Then, the logic questions 202,208 may be based on different properties. For example, if the model produces corresponding permeability and porosity formation realizations, the logic question 202 may be "Is the permeability greater than x millidarcy?," and the logic question 208 may be "Is the porosity greater than y porosity units?"

Further, while the foregoing examples illustrate a CART analysis 108 with only three terminal data sets 204,210,212, the CART analysis applied to each of the formation realizations 106 may be configured with any number of terminal data sets (e.g., 2-10 or more terminal data sets).

In some instances, the candidate formation realization 112 may be further analyzed. For example, one or more of the partitioned data sets (terminal or otherwise) may be mapped, visualized, or otherwise analyzed to determine the connectivity of the volume of the subterranean formation corresponding to the partitioned data set. For example, a data set that is associated with high total organic carbon and high permeability may be shown in a geocellular grid, which, as described above, is a 3-dimensional map of the formation. If the geocellular grid or map illustrates high connectivity, a subsequent fracturing operation may focus on increasing fractures near this volume of the subterranean formation. Alternatively, the geocellular grid or map may illustrate that the data set corresponds to two separate volumes of the subterranean formation each with high connectivity. Accordingly, the subterranean formation may contain fractures in two locations that should be appropriately stimulated.

In some instances, the candidate formation realization 112 may be used to develop the parameters of subsequent wellbore operations (e.g., drilling operations, stimulation operations, production operations, and the like). For example, the candidate formation realization 112 may be used in a program or model that simulates drilling, and the drilling parameters may be derived from the simulated drilling operation.

In some instances, the candidate formation realization 112 may be used to determine if and where zonal isolation should be implemented. For example, the candidate formation realization 112 may have a portion of the formation with a high water content, which may be isolated with packers or other tools to mitigate water production.

In some instances, the candidate formation realization 112 may be used to predict the sweet spots. For example, the candidate formation realization 112 may be used to predict a productive zone as sweet spot in a subterranean formation with very high connectivity.

In some instances, the candidate formation realization 112 may be used to analyze or otherwise calculate the reservoir quality and potential production of the formation.

The methods described herein may be implemented by a set of instructions that cause a processor to perform the CART analysis 108 of the formation realizations 106. In some instances, the processor and set of instructions may also be used for modeling the formation realizations 106. In some instances, the processor and set of instructions may also be used for modeling a subterranean operation based on the candidate formation realization 112.

The processor may be a portion of computer hardware used to implement the various illustrative blocks, modules, elements, components, methods, and algorithms described herein. The processor may be configured to execute one or more sequences of instructions, programming stances, or code stored on a non-transitory, computer-readable medium. The processor can be, for example, a general purpose microprocessor, a microcontroller, a digital signal processor, an application specific integrated circuit, a field programmable gate array, a programmable logic device, a controller, a state machine, a gated logic, discrete hardware components, an artificial neural network, or any like suitable entity that can perform calculations or other manipulations of data. In some embodiments, computer hardware can further include elements such as, for example, a memory (e.g., random access memory (RAM), flash memory, read only memory (ROM), programmable read only memory (PROM), erasable programmable read only memory (EPROM)), registers, hard disks, removable disks, CD-ROMs, DVDs, or any other like suitable storage device or medium.

Executable sequences described herein can be implemented with one or more sequences of code contained in a memory. In some embodiments, such code can be read into the memory from another machine-readable medium. Execution of the sequences of instructions contained in the memory can cause a processor to perform the process steps described herein. One or more processors in a multi-processing arrangement can also be employed to execute instruction sequences in the memory. In addition, hard-wired circuitry can be used in place of or in combination with software instructions to implement various embodiments described herein. Thus, the present embodiments are not limited to any specific combination of hardware and/or software.

As used herein, a machine-readable medium will refer to any medium that directly or indirectly provides instructions to the processor for execution. A machine-readable medium can take on many forms including, for example, non-volatile media, volatile media, and transmission media. Non-volatile media can include, for example, optical and magnetic disks. Volatile media can include, for example, dynamic memory. Transmission media can include, for example, coaxial cables, wire, fiber optics, and wires that form a bus. Common forms of machine-readable media can include, for example, floppy disks, flexible disks, hard disks, magnetic tapes, other like magnetic media, CD-ROMs, DVDs, other like optical media, punch cards, paper tapes and like physical media with patterned holes, RAM, ROM, PROM, EPROM and flash EPROM.

In some embodiments, the measured formation properties 102 may be gathered using measurement-while-drilling (MWD) and logging-while-drilling (LWD) tools, wireline tools, or combinations thereof. Exemplary wellbore tools suitable for gathering measured formation properties may include, but are not limited to, nuclear magnetic resonance tools, gamma ray logging tools, density logging tools, neutron logging tools, geochemical logging tools, mud logging tools, resistivity logging tools, acoustic logging tools, sonic logging tools, borehole imaging logging tools, temperature logging tools, and the like, and any combination thereof. The foregoing wellbore tools may, as suitable, be conveyed along the wellbore and perform corresponding measurements while drilling (i.e., as MWD/LWD tools), while one a wireline or other suitable conveyance (i.e., as wireline tools), or, when two or more tools are used, each may independently be a MWD/LWD tool or a wireline tool.

Figure 3:
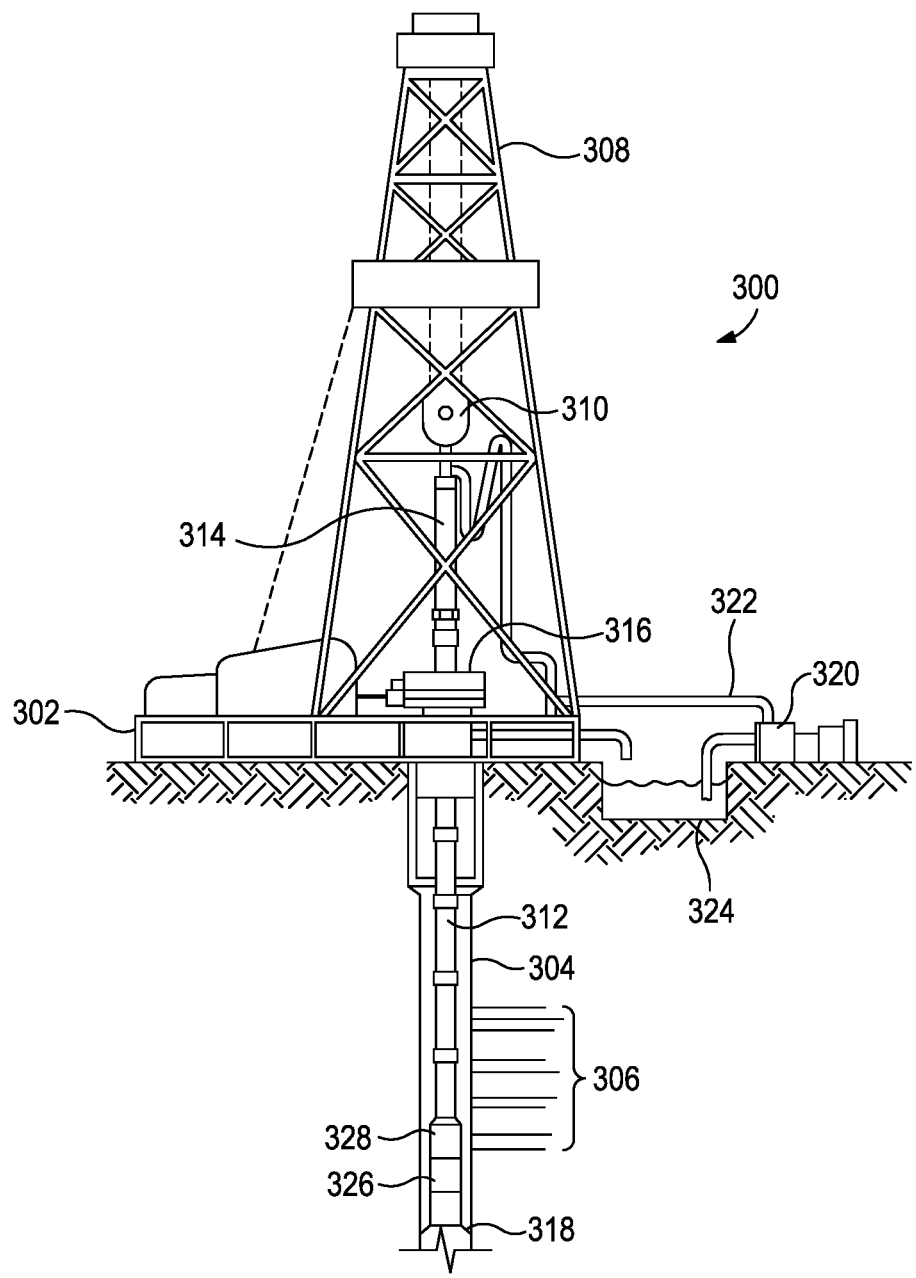
FIG. 3 is a schematic diagram of an exemplary drilling system.

FIG. 3 is a schematic diagram of an exemplary drilling system 300 that may employ the principles of the present disclosure, according to one or more embodiments. As illustrated, the drilling system 300 may include a drilling platform 302 positioned at the Earth's surface and a wellbore 304 that extends from the drilling platform 302 into one or more subterranean formations 306. In other embodiments, such as in an offshore or subsea drilling operation, a volume of water may separate the drilling platform 302 and the wellbore 304.

The drilling system 300 may include a derrick 308 supported by the drilling platform 302 and having a traveling block 310 for raising and lowering a drill string 312. A kelly 314 may support the drill string 312 as it is lowered through a rotary table 316. A drill bit 318 may be coupled to the drill string 312 and driven by a downhole motor and/or by rotation of the drill string 312 by the rotary table 316. As the drill bit 318 rotates, it creates the wellbore 304, which penetrates the subterranean formations 306. A pump 320 may circulate drilling fluid through a feed pipe 322 and the kelly 314, downhole through the interior of drill string 312, through orifices in the drill bit 318, back to the surface via the annulus defined around drill string 312, and into a retention pit 324. The drilling fluid cools the drill bit 318 during operation and transports cuttings from the wellbore 304 into the retention pit 324.

The drilling system 300 may further include a bottom hole assembly (BHA) coupled to the drill string 312 near the drill bit 318. The BHA may comprise one or more MWD/LWD tools 326 configured to take downhole measurements of drilling conditions and/or properties of the surrounding subterranean formation 306. As the drill bit 318 extends the wellbore 304 through the formations 306, the MWD/LWD tools 326 may collect the measured formation property(s) of the subterranean formation 306. The MWD/LWD tools 326 may be communicably coupled (wired or wirelessly) for transferring data to a telemetry module 328 used for further transferring measurements and signals from the BHA to a surface receiver (not shown) and/or to receive commands from the surface receiver. The telemetry module 328 may encompass any known means of downhole communication including, but not limited to, a mud pulse telemetry system, an acoustic telemetry system, a wired communications system, a wireless communications system, or any combination thereof. In some embodiments, the telemetry module 328 may be omitted and the drill string 312 may instead comprise wired drill pipe or wired coiled tubing used to transfer data via wired conductors to a surface receiver. In certain embodiments, some or all of the measurements taken by the MWD/LWD tools 326 may be stored within the MWD/LWD tools 326, BHA, and/or the telemetry module 328 for later retrieval at the surface upon retracting the drill string 312.

Figure 4:
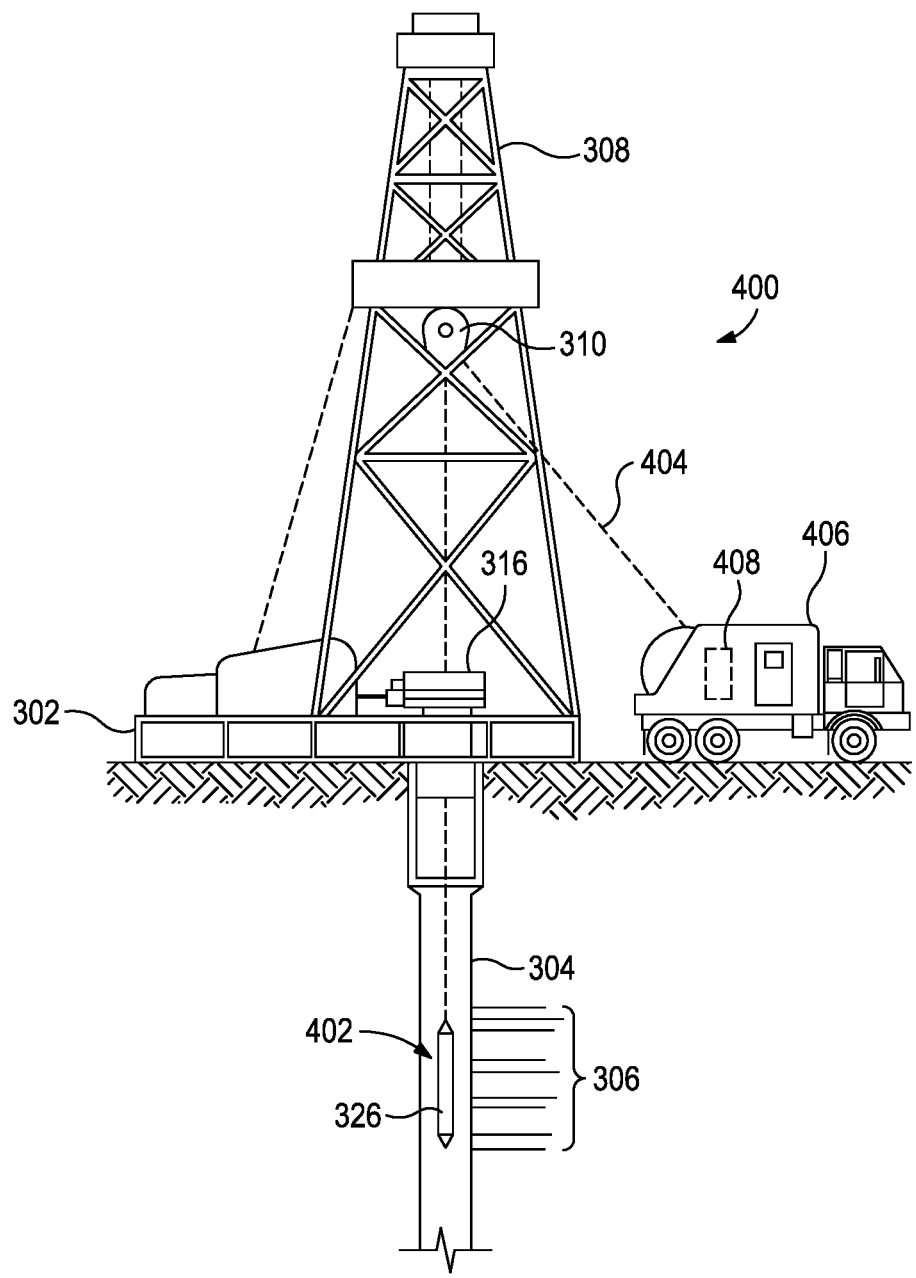
FIG. 4 depicts a schematic diagram of an exemplary wireline system.

At various times during or after the drilling process, including after stimulation operations, the drill string 312 or other apparatus extending into the wellbore (e.g., a work string for perforating the formation) may be removed from the wellbore 304, as shown in FIG. 4, to conduct measurement/logging operations. More particularly, FIG. 4 depicts a schematic diagram of an exemplary wireline system 400 that may employ the principles of the present disclosure, according to one or more embodiments. Like numerals used in FIGS. 3 and 4 refer to the same components or elements and, therefore, may not be described again in detail. As illustrated, the wireline system 400 may include a one or more wireline tools 402 that may be suspended into the wellbore 304 by a cable 404. The wireline tools 402 may be communicably coupled to the cable 404. The cable 404 may include conductors for transporting power to the wireline tools 402 and also facilitate communication between the surface and the wireline tools 402. A logging facility 406, shown in FIG. 4 as a truck, may collect measurements from the wireline tools 402, and may include computing facilities 408 for controlling, processing, storing, and/or visualizing the measurements gathered by the wireline tools 402. The computing facilities 408 may be communicably coupled to the wireline tools 402 by way of the cable 404.

In each of the foregoing drilling and wireline systems, the methods and processes described herein (or portions thereof) that utilize the CART analysis may be implemented on-site (e.g., at a computer or processor on-site like the computing facilities 408 illustrated in the wireline system of FIG. 4 or a similar computing facility at the drilling system of FIG. 3). Alternatively or in conjunction therewith, the methods and processes described herein (or portions thereof) that utilize the CART analysis may be performed off-site where the measured formation properties 102 are transmitted (wired or wirelessly) or physically delivered to the off-site location.

Examples described herein include, but are not limited to, Examples A-C.

Example A is a method comprising: applying a classification and regression tree algorithm (CART) analysis to a plurality of formation realizations using a first formation property of a subterranean formation as a predictor in the CART analysis, wherein the plurality of formation realizations are for a second formation property and are based on at least one measured formation property, thereby yielding an association between the first and second properties for each of the plurality of formation realizations; analyzing a strength of the association for each of the plurality of formation realizations; and selecting a candidate formation realization from the plurality of formation realizations based on the strength of the association.

Example B is a system comprising: a wellbore tool (e.g., any of the wellbore tools (wireline or MWD/LWD) described herein or similar tools) placed along a wellbore extending into a subterranean formation; a non-transitory computer-readable medium coupled to the wellbore tool to receive a measured formation property from the wellbore tool and encoded with instructions that, when executed, perform operations comprising: applying a classification and regression tree algorithm (CART) analysis to a plurality of formation realizations using a first formation property of a subterranean formation as a predictor in the CART analysis, wherein the plurality of formation realizations are for a second formation property and are based on at least one measured formation property, thereby yielding an association between the first and second properties for each of the plurality of formation realizations; analyzing a strength of the association for each of the plurality of formation realizations; and selecting a candidate formation realization from the plurality of formation realizations based on the strength of the association.

Example C is a non-transitory computer-readable medium encoded with instructions that, when executed, perform operations comprising: applying a classification and regression tree algorithm (CART) analysis to a plurality of formation realizations using a first formation property of a subterranean formation as a predictor in the CART analysis, wherein the plurality of formation realizations are for a second formation property and are based on at least one measured formation property, thereby yielding an association between the first and second properties for each of the plurality of formation realizations; analyzing a strength of the association for each of the plurality of formation realizations; and selecting a candidate formation realization from the plurality of formation realizations based on the strength of the association.

Each of Examples A, B, and C may independently, optionally further include any one or more of the following alternatively or additionally: Element 1: the method further comprising (or the instructions that, when executed, perform operations that further comprise) modeling the second formation property for the subterranean formation based on the at least one measured formation property, thereby producing the plurality of formation realizations that are then used in the CART analysis; Element 2: wherein the predictor is a first predictor and the method further comprising (or the instructions that, when executed, perform operations that further comprise) using a third formation property of a subterranean formation as a second predictor in the CART analysis, wherein the association is between the first, second, and third properties; Element 3: the method further comprising (or the instructions that, when executed, perform operations that further comprise) developing parameters for a wellbore operation based on the candidate formation realization; Element 4: Element 3 and the method further comprising (or the instructions that, when executed, perform operations that further comprise) performing the wellbore operation on the subterranean formation based on the parameters developed; Element 5: wherein the CART analysis produces two or more data sets partitioned based on the first property, and wherein the method further comprises: mapping one of the two or more data sets to geocellular grid of the subterranean formation; Element 6: wherein the first property is a categorical property; Element 7: wherein the second property is a categorical property; Element 8: wherein the first property is a numerical property; Element 9: wherein the second property is a numerical property; Element 10: wherein the first property of the subterranean formation is selected from the group consisting of: a lithology facies, a type of hydrocarbon, a porosity, a permeability, a water saturation, an hydrocarbon production amount, a proppant volume, a modulus of elasticity, in situ facies stresses, a leak-off coefficient, and a Poisson's ratio; Element 11: wherein the second property of the subterranean formation is selected from the group consisting of: a lithology facies, a type of hydrocarbon, a porosity, a permeability, a water saturation, an hydrocarbon production amount, a proppant volume, a modulus of elasticity, in situ facies stresses, a leak-off coefficient, and a Poisson's ratio; Element 12: wherein the plurality of formation realizations are 3-dimensional grid matrices of the subterranean formation; Element 13: wherein the plurality of formation realizations are 1-dimensional arrays of the subterranean formation; Element 14: wherein the plurality of formation realizations is a plurality of first formation realizations, and wherein the method further comprises (or the instructions that, when executed, perform operations that further comprise) applying the CART analysis to a plurality of second formation realizations using the first formation property as the predictor in the CART analysis, wherein the plurality of second formation realizations are for a third formation property; and wherein the association is further between the first and third formation properties for each of the plurality of second formation realizations; Element 15: Element 14 and the method further comprising (or the instructions that, when executed, perform operations that further comprise) modeling the second and third formation properties for the subterranean formation based on at least one measured formation property, thereby producing the plurality of first formation realizations and the plurality of second formation realizations that correspond and are then used in the CART analysis; Element 16: Element 14 and wherein the third property is a categorical property; Element 17: Element 14 and wherein the third property is a numerical property; Element 18: Element 14 and wherein the third property of the subterranean formation is selected from the group consisting of: a lithology facies, a type of hydrocarbon, a porosity, a permeability, a water saturation, an hydrocarbon production amount, a proppant volume, a modulus of elasticity, in situ facies stresses, a leak-off coefficient, and a Poisson's ratio; Element 19: the method further comprising (or the instructions that, when executed, perform operations that further comprise) measuring the at least one measured formation property with a wellbore tool (e.g., any of the wellbore tools (wireline or MWD/LWD) described herein or similar tools); and Element 20: wherein the at least one measured formation property is two or more formation measured properties including a first measured formation property is from a wireline tool and the second measured formation property is from a MWD/LWD tool.

By way of nonlimiting examples, suitable combinations may include, but are not limited to, one or more of Elements 1, 2, 3, 4, 5, 10, 11, 12, 13, 14 (which, when in combination with Element 2, the reference to third formation property in Element 14, and any dependent Elements, is updated accordingly to fourth formation property), 19, or 20 in combination; one of Elements 6-7 in combination with one of Elements 8-9 and optionally in further combination with Element 14 and optionally Element 15, Element 18, and/or one of Elements 16-17; one of Elements 6-7 in combination with Element 14 and optionally Element 15, Element 18, and/or one of Elements 16-17; one of Elements 8-9 in combination with Element 14 and optionally Element 15, Element 18, and/or one of Elements 16-17; Elements, 1, 14, and 15 in combination and optionally in further combination with one of Elements 6-7 and/or one of Elements 8-9; Element 5 and/or Element 3 (optionally with Element 4) in combination with Element 1; Element 5 and/or Element 3 (optionally with Element 4) in combination with Element 2; Element 5 and/or Element 3 (optionally with Element 4) in combination with Element 14 and optionally Element 15, Element 18, and/or one of Elements 16-17; Element 5 and/or Element 3 (optionally with Element 4) in combination with Element 19; Element 5 and/or Element 3 (optionally with Element 4) in combination with Element 20; Element 19 and/or Element 20 in combination with Element 1; Element 19 and/or Element 20 in combination with Element 2; Element 19 and/or Element 20 in combination with Element 14 and optionally Element 15, Element 18, and/or one of Elements 16-17; and combinations thereof.

Unless otherwise indicated, all numbers expressing quantities like formation properties, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present disclosure. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating the present disclosure are presented herein. Not all features of a physical implementation are described or shown in this application for the sake of clarity. It is understood that in the development of a physical embodiment incorporating the embodiments of the present disclosure, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While compositions and methods are described herein in terms of "comprising" various components or steps, the compositions and methods can also "consist essentially of" or "consist of" the various components and steps.

To facilitate a better understanding of the embodiments of the present disclosure, the following examples of preferred or representative embodiments are given. In no way should the following examples be read to limit, or to define, the scope of the present disclosure.

EXAMPLES

The porosity of a subterranean formation was modeled based on logging data to produce 25 formation realizations that were mapped onto a geocellular grid. A lithology facies predictor realization was provided for the formation in a geocellular grid. Each of the 25 formation realizations were subjected to a CART analysis. The terminal data sets based on the porosity-based logic questions were then correlated to the lithology facies in the predictor realization.

Figure 5:
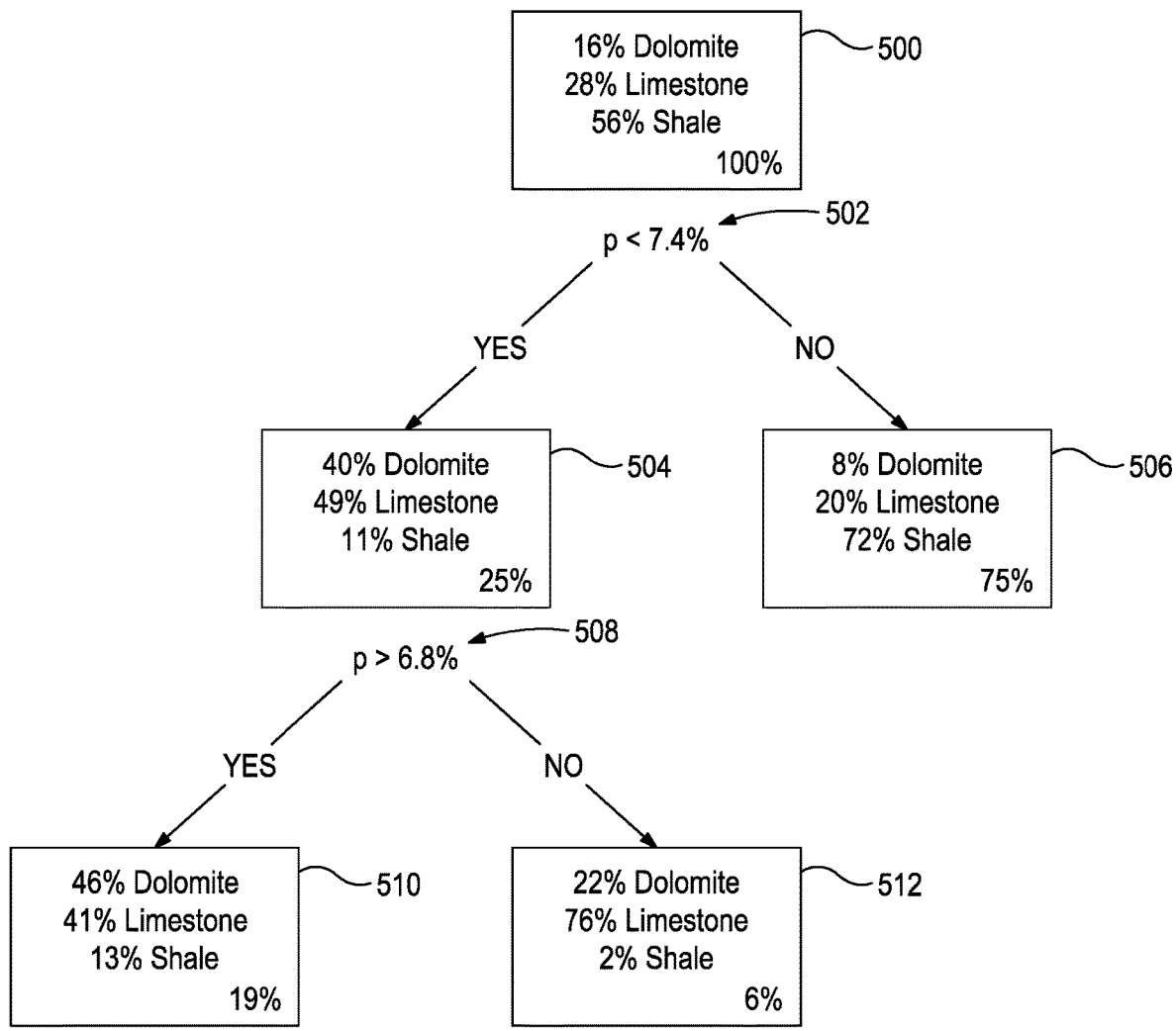
FIG. 5 illustrates a CART analysis applied to a formation realization.
Figure 6:
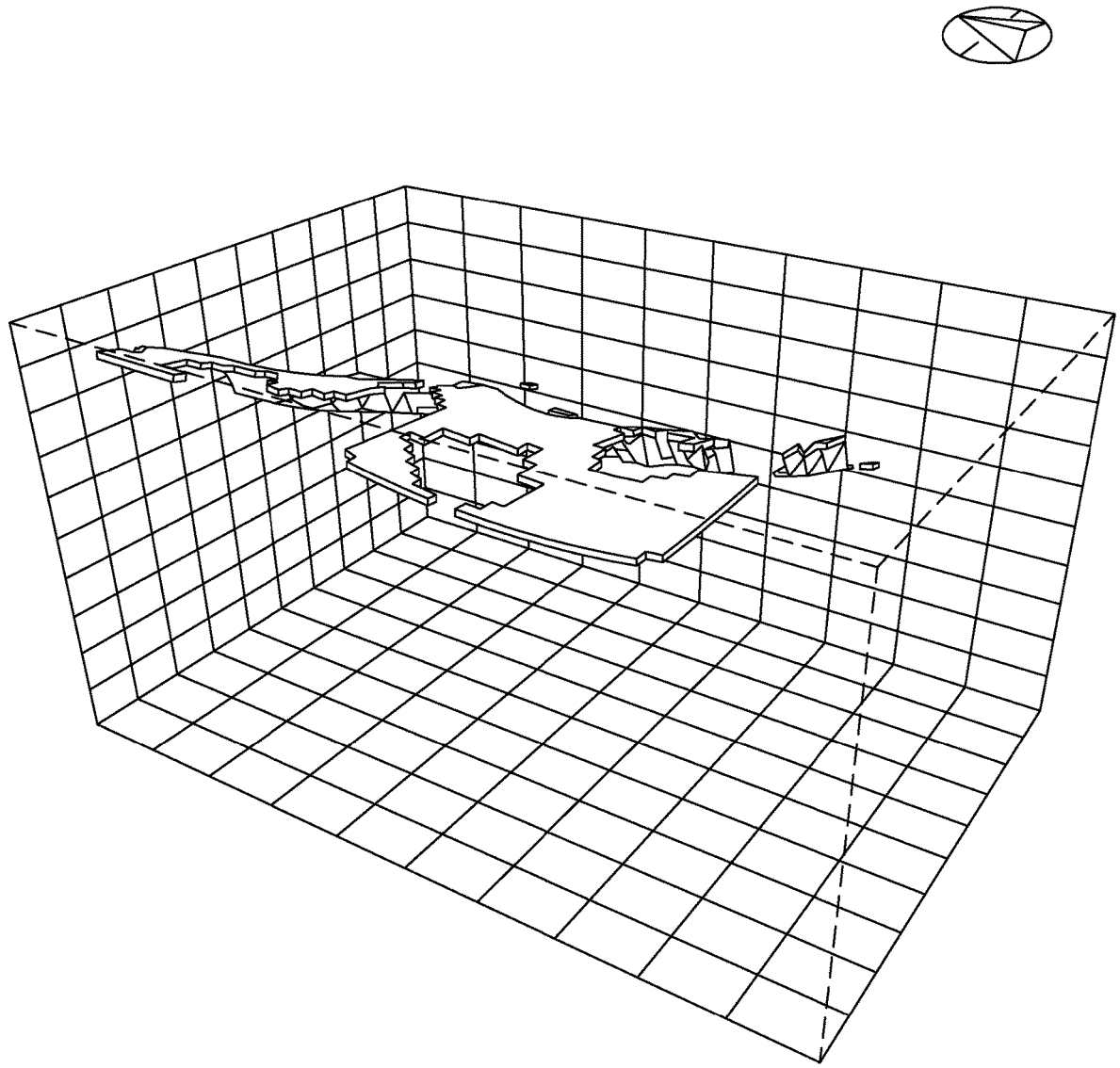
FIG. 6 is a 3-dimensional grid matrix or map of a data set identified by the CART analysis of FIG. 5.

For example, FIG. 5 illustrates the CART analysis of the $23^{rd}$ realization ("Realization 23"). First, the full data set 500 of Realization was correlated to the lithology facies in the predictor realization yielding 56% shale, 28% limestone, and 16% dolomite. The logic question 502 applied to the data set 500 was "Is the porosity less than 7.4%?," which according to the CART analysis best split or partitioned the data set 500 of Realization 23 into two data sets: a yes data set 504 that is 25% of the original data set 500 and a no data set 506 that is 75% of the original data set 500. The yes data set 504 has a lithology facies composition that is 40% dolomite, 49% limestone, and 11% shale, and the no data set 506 has a lithology facies composition that is 8% dolomite, 20% limestone, and 72% shale. The resultant no data set 506 is primarily shale. The resultant yes data set 504 is not clearly dolomite or limestone, so a second split was performed. The yes data set 504 was partitioned again according to the second logic question "Is the porosity greater than or equal to 6.8%?" to yield a yes data set 510 that is 19% of the original data set 500 and a no data set 512 that is 6% of the original data set 500. The yes data set 510 has a lithology facies composition that is 46% dolomite, 41% limestone, and 13% shale, which is primarily dolomite. The no data set 512 has a lithology facies composition that is 22% dolomite, 76% limestone, and 2% shale, which is primarily limestone. The CART analysis of Realization 23 shows a strong association between the lithology facies and the porosity. Therefore, Realization 23 may be further analyzed. For example, if the volume corresponding to the data set 510 that is predominantly dolomite is of interest, a user of the CART analysis may visualize just that portion of the formation to analyze the connectivity of the volume within the formation. FIG. 6 is a 3-dimensional grid matrix or map of the data set 510. Based on this connectivity analysis, the well placement and sweet spot prediction may be developed.

Therefore, the present disclosure is well adapted to attain the ends and advantages mentioned as well as those that are inherent therein. The particular embodiments disclosed above are illustrative only and may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

What is claimed is:

1. A method comprising:
   Applying, by a computer processor coupled a non-transitory computer-readable medium and in communication with a wellbore tool extending into a subterranean formation, a classification and regression tree algorithm (CART) analysis to a plurality of formation realizations using a first formation property of a subterranean formation as a predictor in the CART analysis, wherein the plurality of formation realizations are for a second formation property and are based on at least one measured formation property, thereby yielding an association between the first and second formation properties for each of the plurality of formation realizations
   analyzing a strength of the association for each of the plurality of formation realizations; and
   selecting a candidate formation realization from the plurality of formation realizations based on the strength of the association and storing the candidate formation on the non-transitory computer-readable medium.

2. The method of claim 1 further comprising:
   modeling the second formation property for the subterranean formation based on the at least one measured formation property, thereby producing the plurality of formation realizations that are then used in the CART analysis.

3. The method of claim 1, wherein the predictor is a first predictor and the method further comprises:
   using a third formation property of a subterranean formation as a second predictor in the CART analysis, wherein the association is between the first, second, and third formation properties.

4. The method of claim 1, further comprising:
   developing parameters for a wellbore operation based on the candidate formation realization.

5. The method of claim 4 further comprising:
   performing the wellbore operation on the subterranean formation based on the parameters developed.

6. The method of claim 1, wherein the CART analysis produces two or more data sets partitioned based on the first formation property, and wherein the method further comprises:
   mapping one of the two or more data sets to geocellular grid of the subterranean formation.

7. The method of claim 1, wherein the second formation property of the subterranean formation is a categorical property.

8. The method of claim 1, wherein the second formation property of the subterranean formation is selected from the group consisting of: a lithology facies, a type of hydrocarbon, a porosity, a permeability, a water saturation, an hydrocarbon production amount, a proppant volume, a modulus of elasticity, in situ facies stresses, a leak-off coefficient, and a Poisson's ratio.

9. The method of claim 1, wherein the plurality of formation realizations are 3-dimensional grid matrices of the subterranean formation.

10. The method of claim 1, wherein the plurality of formation realizations are I-dimensional arrays of the subterranean formation.

11. The method of claim 1, wherein the plurality of formation realizations is a plurality of first formation realizations, and wherein the method further comprises:
    applying the CART analysis to a plurality of second formation realizations using the first formation property as the predictor in the CART analysis, wherein the plurality of second formation realizations are for a third formation property; and
    wherein the association is further between the first and third formation properties for each of the plurality of second formation realizations.

12. The method of claim 11 further comprising:
    modeling the second and third formation properties for the subterranean formation based on the at least one measured formation property, thereby producing the plurality of first formation realizations and the plurality of second formation realizations that correspond and are then used in the CART analysis.

13. A system comprising:
    a wellbore tool placed along a wellbore extending into a subterranean formation;
    a non-transitory computer-readable medium coupled to the wellbore tool to receive a measured formation property from the wellbore tool and encoded with instructions that, when executed, perform operations comprising:
    applying a classification and regression tree algorithm (CART) analysis to a plurality of formation realizations using a first formation property of a subterranean formation as a predictor in the CART analysis, wherein the plurality of formation realizations are for a second formation property and are based on at least one measured formation property, thereby yielding an association between the first and second formation properties for each of the plurality of formation realizations;
    analyzing a strength of the association for each of the plurality of formation realizations; and
    selecting a candidate formation realization from the plurality of formation realizations based on the strength of the association.

14. The system of claim 13, wherein the instructions that, when executed, perform operations that further comprise:
    modeling the second formation property for the subterranean formation based on the at least one measured formation property, thereby producing the plurality of formation realizations that are then used in the CART analysis.

15. The system of claim 13, wherein the predictor is a first predictor and wherein the instructions that, when executed, perform operations that further compose:
    using a third formation property of a subterranean formation as a second predictor in the CART analysis, wherein the association is between the first, second, and third formation properties.

16. The system of claim 13, wherein the instructions that, when executed, perform operations that further comprise:
    developing parameters for a wellbore operation based on the candidate formation realization.

17. A non-transitory computer-readable medium encoded with instructions that, when executed, perform operations comprising:
    applying a classification and regression tree algorithm (CART) analysis to a plurality of formation realizations using a first formation property of a subterranean formation as a predictor in the CART analysis, wherein the plurality of formation realizations are for a second formation property and are based on at least one measured formation property, thereby yielding an association between the first and second formation properties for each of the plurality of formation realizations;
    analyzing a strength of the association for each of the plurality of formation realizations; and
    selecting a candidate formation realization from the plurality of formation realizations based on the strength of the association.

18. The non-transitory computer-readable medium of claim 17, wherein the instructions that, when executed, perform operations that further comprise:
    modeling the second formation property for the subterranean formation based on the at least one measured formation property, thereby producing the plurality of formation realizations that are then used in the CART analysis.

19. The non-transitory computer-readable medium of claim 17,
    wherein the predictor is a first predictor and wherein the instructions that, when executed, perform operations that further comprise:
    using a third formation property of a subterranean formation as a second predictor in the CART analysis, wherein the association is between the first, second, and third formation properties.

20. The non-transitory computer-readable medium of claim 17, wherein the instructions that, when executed, perform operations that further comprise: developing parameters for a wellbore operation based on the candidate formation realization.

* * * * *